Nov. 28, 1939.　　　　J. G. MAAS　　　　2,181,788
VEHICLE CRANK SUPPORT
Filed June 13, 1939
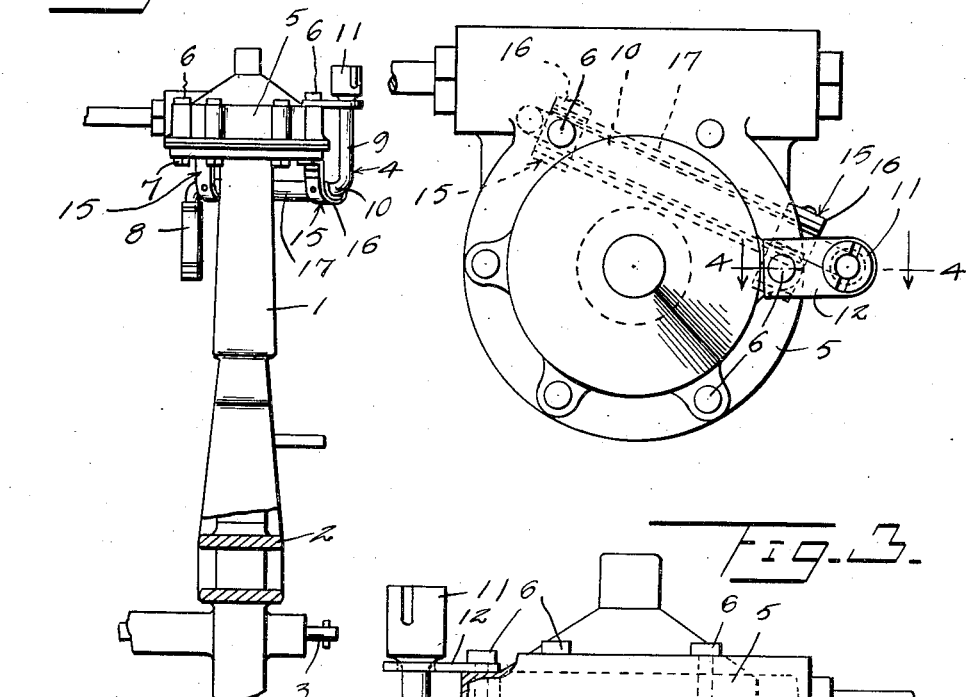
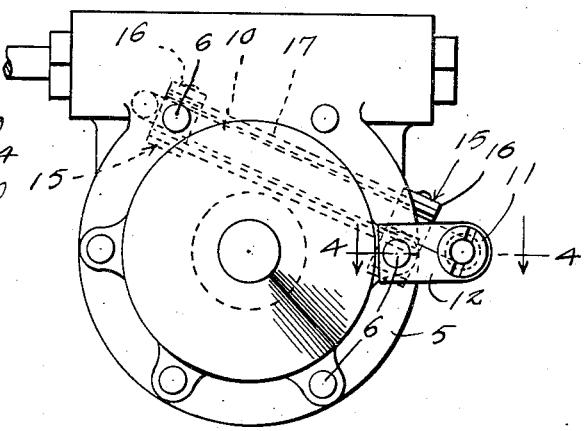
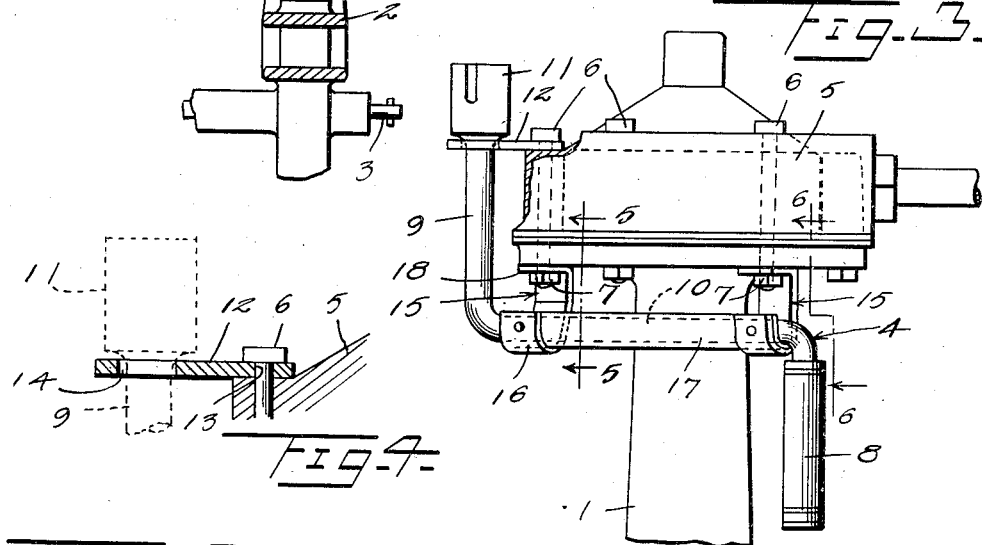
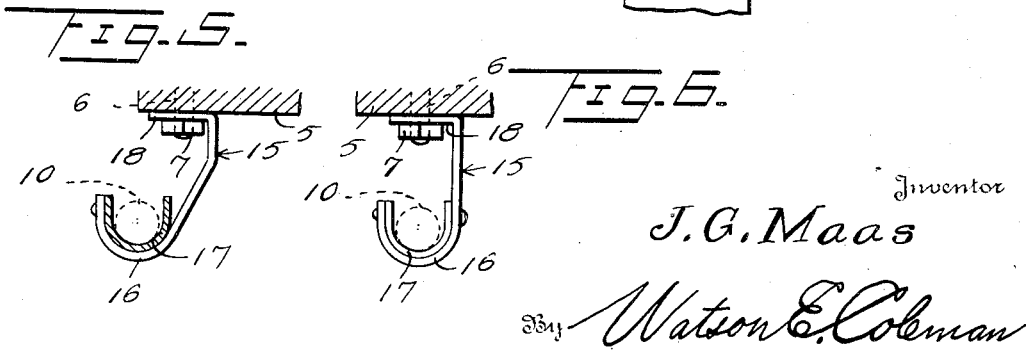
Inventor
J. G. Maas
By Watson E. Coleman
Attorney Patented Nov. 28, 1939

2,181,788

UNITED STATES PATENT OFFICE 2,181,788

VEHICLE CRANK SUPPORT

John G. Maas, Bancroft, Nebr.

Application June 13, 1939, Serial No. 278,959

3 Claims. (Cl. 74—551)

This invention relates to a supporting means or carrier for the starting crank of a motor vehicle and has for its primary object to provide a novel means for suspending or securing the starting crank of a tractor in a position where such crank cannot become lost during the use of a machine.

The present invention relates primarily to the type of tractor which is sold on the market under the name of the "International" tractor. In this type of tractor the starting crank is not secured in such a way as to prevent it from becoming loose from the shaft to which it is attached for the purpose of starting the tractor engine and as a result the owners of such tractors have to frequently replace the cranks as the same become loose or slip off from the supporting shaft as a result of vibration during the use of the machine.

In accordance with the present invention a novel carrier is provided upon the tractor mechanism directly above the shaft to which the operating crank is attached for use, whereby such crank may be suspended in such a manner that it will be securely held and, at the same time, it will be out of the way and cannot catch on to brush or other objects over which the machine may be passing.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claims.

In the drawing:

Figure 1 is a view in side elevation of a portion of a steering mechanism in association with which the present device is used.

Figure 2 is a top plan view of the structure shown in Figure 1.

Figure 3 is a view in side elevation on an enlarged scale of the upper part of the steering structure showing the present invention in use thereon.

Figure 4 is a section on the line 4—4 of Figure 2.

Figure 5 is a section on the line 5—5 of Figure 3.

Figure 6 is a section on the line 6—6 of Figure 3.

Referring now more particularly to the drawing, there is illustrated a portion of the steering mechanism which forms a part of the particular type of tractor previously referred to. This portion of the steering mechanism consists of a vertically arranged housing 1 which is supported at the front of the tractor, the lower part of this housing being connected with a transverse beam or base portion 2 through which extends a stub shaft 3 which is connected with the engine crank shaft so that such shaft may be rotated when the hand crank 4 is connected with the stub shaft at its forward end.

The housing 1 encases a part of the steering mechanism and at its upper end this housing terminates in a gear casing 5 in which suitable gears are enclosed for transmitting power from one shaft to another which forms a part of the steering unit. This housing is provided with vertical bolts 6 by means of which parts of the housing are secured together, the bolts carrying removable nuts 7 upon one end. The crank 4 is of the usual type having a handle portion 8 and a terminal shaft connecting portion 9 connected by the angular intermediate portion 10, the terminal portion having a notched head or cap 11 which receives the forward end of the stub shaft 3 when the crank is used for starting the engine. The sole connection between the head 11 of the crank and the forward end of the stub shaft 3 is a pin (not shown) which is carried by the shaft 3 which engages in notches in the head 11 and consequently a slight vibration will cause the crank to shift to the point where it will fall off.

In accordance with the present invention, there is provided a flat bracket plate 12 which is provided adjacent one end with a bolt opening 13 for the reception of one of the bolts 6 of the steering mechanism gear housing. This plate is secured by the bolt so that the major portion of the plate will project forwardly from the housing 5 and this projecting end portion of the plate is provided with an opening 14 through which the parts 8, 9 and 10 of the crank may pass but which will not permit the head 11 to pass.

To the underside of the housing 5 there are attached by means of two of the bolts 6, the pair of hook brackets 15, each of which consists of a vertical portion which terminates at its lower end in the upturned loop or hook 16. These loops are arranged at the same elevation and alined so that there may be suspended within them the connecting trough or cradle 17. This cradle is preferably welded or otherwise suitably secured to the hooks 16 of the brackets. The upper ends of each of the brackets 15 is laterally turned, as indicated at 18, to position against the underside of the gear housing 5 and is apertured to receive a bolt 6. Thus, the bolts of the gear housing are made use of for securing the crank support which forms the present invention.

It will, of course, be apparent that the crank support is so designed that the apertured bracket plate 12 is at a higher elevation than the cradle 17 and is disposed substantially above one end of the cradle. Thus, it will be seen that when the crank 4 is removed from the shaft 3, it may be readily mounted in the support which is provided for it, by inserting the free end of the handle 8, through the aperture 14 of the bracket 12 and then oscillating the crank in the proper direction to permit the portion 10 to slide down through the opening of the plate and oscillating the crank back in the opposite direction so that the portion 9 will slip through the opening 14 to thus bring the head 11 into position upon the top of the plate 12. The handle and the terminal portion 9 of the crank will then be vertically arranged and the intermediate portion 10 may be swung around into the position where it will lie in the trough 17.

From the foregoing it will be readily seen that the device herein provided constitutes a novel and secure means of mounting or hanging the crank when it is not in use. When so mounted it cannot become lost or pulled free even though the tractor may be driven through undergrowth which would hook around the crank as it is impossible for it to be lifted by such means back through the aperture of the plate 12.

I claim:

1. In a tractor structure of the type having a steering mechanism housing at the front thereof terminating at its upper end in a gear housing, a starting crank carrier comprising a cradle-like member attached to said housing and adapted to receive a portion of the crank, the crank having a head upon one end and an apertured bracket plate secured to the housing adjacent said structure through which the portion of the crank adjacent said head extends, the head being supported upon the plate while the first mentioned portion of the crank is supported in said cradle.

2. A vehicle starting crank support comprising a horizontally disposed plate member having an aperture adapted to receive the body of the crank, the crank having a head at one end which is adapted to rest upon the top of the support when the body of the crank is extended therethrough, and a trough-like body mounted horizontally at an elevation below said plate and to one side thereof and adapted to receive an angular portion of the crank longitudinally therein when the said head is supported upon the bracket plate in the manner described.

3. The combination with a tractor steering mechanism having a front vertically disposed casing surmounted by a gear housing having vertically arranged bolts, of a starting crank support consisting of a straight flat plate having two apertures therethrough, one of said apertures being traversed by one of said bolts to secure the plate at one end upon the top of the gear casing, the other end of the plate projecting forwardly from the casing, the aperture of the said projecting other end of the plate being adapted to have the body of the crank slidably extended therethrough, the crank having a head adapted to rest upon the top of the plate, a pair of hook brackets secured by two of said bolts to the underside of said gear casing to be suspended therefrom, and an elongated trough-like body engaged at its ends in the hooks of said pair of brackets and secured thereto and providing a receiving means for a portion of the crank lying between the ends thereof when the said head of the crank is carried upon the bracket plate in the manner described.

JOHN G. MAAS.